United States Patent [19]

Fuchs

[11] Patent Number: 5,367,344
[45] Date of Patent: Nov. 22, 1994

[54] EYEGLASSES WITH IMPROVED LENS HOLDER

[75] Inventor: Gerhard Fuchs, Pasching, Austria

[73] Assignee: Silhouette International Gesellschaft m.b.H., Linz, Austria

[21] Appl. No.: 30,560

[22] Filed: Mar. 12, 1993

[30] Foreign Application Priority Data

Mar. 16, 1992 [AT] Austria ................................. 519/92

[51] Int. Cl.$^5$ .............................................. G02C 5/00
[52] U.S. Cl. ................................... 351/41; 351/103;
351/106; 351/108; 351/110; 351/140; 351/141
[58] Field of Search ................. 351/41, 103, 106, 108,
351/109, 110, 140, 141

[56] References Cited

U.S. PATENT DOCUMENTS

| | | | |
|---|---|---|---|
| 2,518,914 | 8/1950 | Lissac | 351/110 |
| 2,828,668 | 4/1958 | De Angelis | 351/109 |
| 2,894,429 | 7/1959 | Lissac | 351/108 |
| 4,950,066 | 8/1990 | Hartman | 351/106 |
| 4,976,529 | 12/1990 | Segoshi et al. | 351/41 |
| 5,127,723 | 7/1992 | Hyoi | 351/41 |

FOREIGN PATENT DOCUMENTS

| | | | |
|---|---|---|---|
| 1062717 | 4/1954 | France. | |
| 1106020 | 12/1955 | France | 351/103 |
| 1171012 | 1/1959 | France | 351/108 |
| 80987 | 6/1963 | France | 351/108 |
| 2585141 | 1/1987 | France | 351/106 |
| 934551 | 9/1955 | Germany. | |
| 2136802 | 5/1978 | Germany | 351/110 |

Primary Examiner—Richard A. Bertsch
Assistant Examiner—Howard R. Richman
Attorney, Agent, or Firm—Collard & Roe

[57] ABSTRACT

In eyeglasses comprising glass-holding means which comprise pairs of retaining pins, which extend in respective bores of the lenses and are carried by a lens-holding portion of the eyeglass frame, it is desired to provide lens-holding means which are simple in design. To that end each pair of the retaining pins are constituted by two legs of a U-shaped wire and are connected by a crosspiece, which is connected to the lens-holding portion of the eyeglass frame.

8 Claims, 2 Drawing Sheets

EYEGLASSES WITH IMPROVED LENS HOLDER

BACKGROUND OF THE INVENTION

1. Field of the Invention

This invention relates to eyeglasses, particularly to lens-holding means comprising pairs of retaining pins, which extend into respective bores of the lenses and are carried by a lens-holding portion of the eyeglass frame.

2. Description of the Prior Art

In known eyeglasses comprising lens-holding means which leave the rims of the lenses free, the lenses are connected to the lens-holding portion of the eyeglass frame by means of screws, which extend through bores of the lenses and are screwed into tapped bores of the lens-holding portion of the eyeglass frame. Such known lens-holding means have the disadvantage that the tapped bores in the lens-holding portion of the eyeglass frame have predetermined female screw threads so that the spacing of the bores in the lenses must closely match the spacing of the tapped bores and this fact may give rise to difficulties in the mounting of the lenses because any dimensional deviation cannot be compensated. Besides, it is not possible subsequently to adjust the lenses relative to the eyeglass frame, the lens-holding portions of the eyeglass frame must be provided with tapped bores in a time-consuming operation, and the lens-holding portions of the eyeglass frame must be sufficiently large for the accommodation of such tapped bores.

SUMMARY OF THE INVENTION

It is an object of the invention to provide eyeglasses which are of the kind described first hereinbefore and in which said disadvantages are avoided in that the glass-holding means permit a compensation of deviations of the spacing of the bores in the lens and permit a simple mounting of the lenses.

That object is accomplished in accordance with the invention in that each pair of the retaining pins are constituted by two legs of a U-shaped wire and are connected by a crosspiece, which is connected to the lens-holding portion of the eyeglass frame.

Because the two retaining pins are connected to form a U-shaped wire, the deformability of the U-shaped wire permits an effective compensation of any deviation of the distance between the bores in the lens from the spacing of the retaining pins so that the mounting of the lenses is greatly-facilitated. Because the U-shaped wire is connected to the lens-holding portion of the eyeglass frame by the crosspiece which connects the two legs, the lenses can subsequently be adjusted relative to the eyeglass frame in that the U-shaped wires are correspondingly deformed.

The lenses can be mounted in various ways on the retaining pins which are constituted by the U-shaped wire. For instance, the heads of the retaining pins may be enlarged like rivets after the retaining pins have been inserted through the bores of the lens. But a much more favorable fixation can be achieved if the retaining pins are held in the bores of the lens by pluglike plastic bushings because in that case it will be sufficient to slide the lens on the retaining pins, which have previously been provided with the plastic bushings. Such pluglike plastic bushings serve not only to clamp the lens on the retaining pins but also prevent an exertion of non-permissible stresses on the lenses by the retaining pins. To ensure that the lenses can be secured to the U-shaped wires as by plugs, it is necessary to ensure that sufficiently strong frictional joints will be established between the retaining pins and the plastic bushings and between the latter and the surfaces of the bores in the lenses. This can be achieved in a simple manner in that the inside and/or outside peripheral surfaces of the pluglike plastic bushings and/or the outside peripheral surfaces of the retaining pins are formed with axially spaced apart annular ribs, which are barb-shaped in cross-section.

The joints between the retaining pins and the lenses with a plastic member interposed may alternatively be established in that each retaining pin is formed with screw threads and provided with a retaining head of plastic, which is screwed on said screw threads when the retaining pins extends in a bore of the lens. In that case the lenses can be mounted in that they are fitted on the retaining pins and the retaining heads are subsequently screwed on the pins. For that purpose the retaining heads are suitably provided with lateral flats to be engaged by an implement.

To ensure that the retention of the lenses does not depend on the plug joints between the lenses and the U-shaped wires, the crosspiece of each U-shaped wire may constitute a stop, which is engageable by the lens to assist the positioning of the lens.

The U-shaped wire may be secured in various ways to the lens-holding portion of the eyeglass frame. For the design and manufacture it will be desirable to connect the U-shaped wire to the lens-holding portion of the eyeglass frame by a deformable soldered joint because the adjusting of the lenses will be further facilitated in that case. Such deformable soldered joints can easily be provided and do not impose special restrictions as regards the design of the lens-holding portions of the eyeglass frame.

DETAILED DESCRIPTION OF THE PREFERRED EMBODIMENTS

Figure 1:
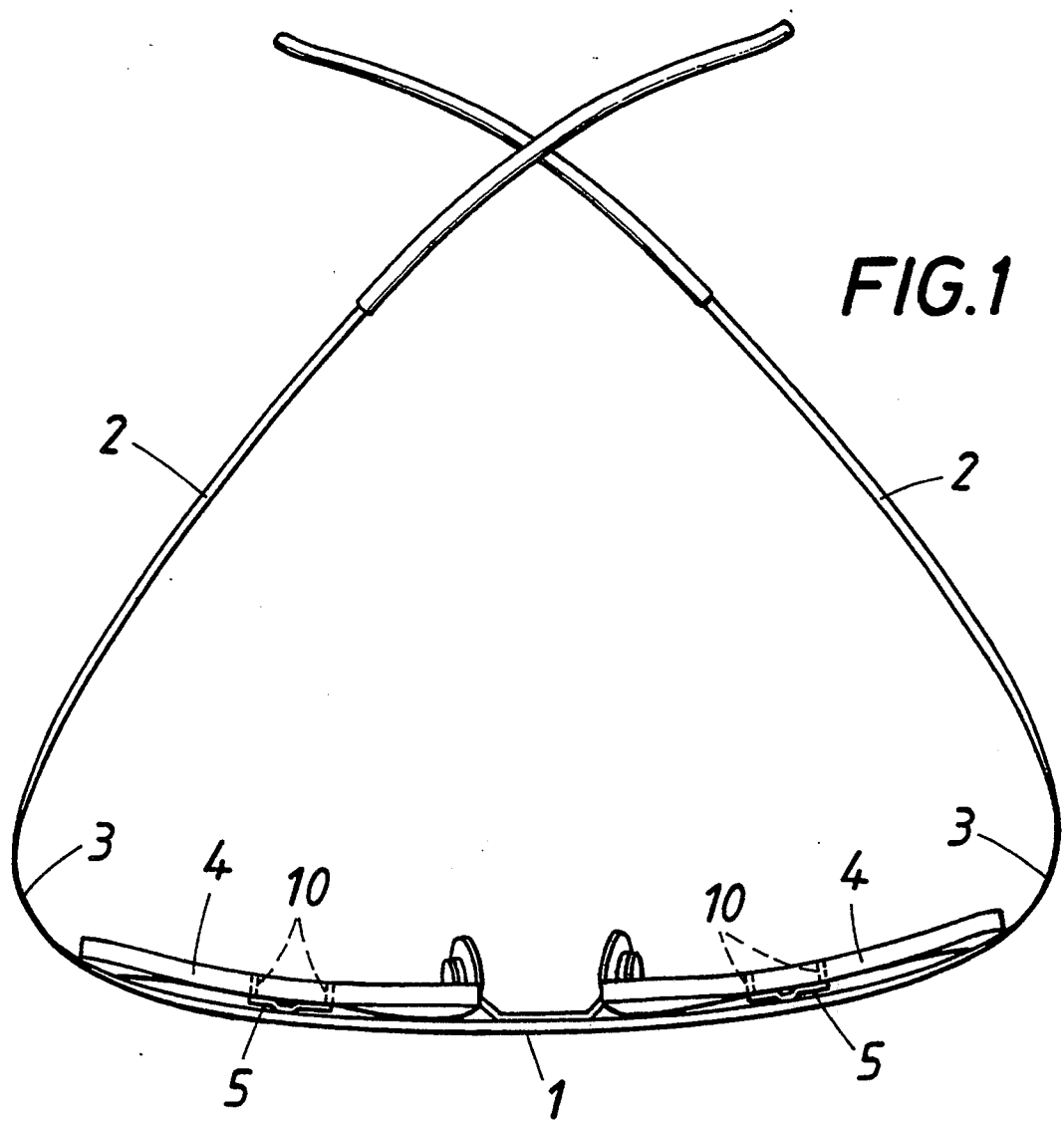
FIG. 1 is a simplified top plan view showing eyeglasses provided with lens-holding means according to the invention.
Figure 2:
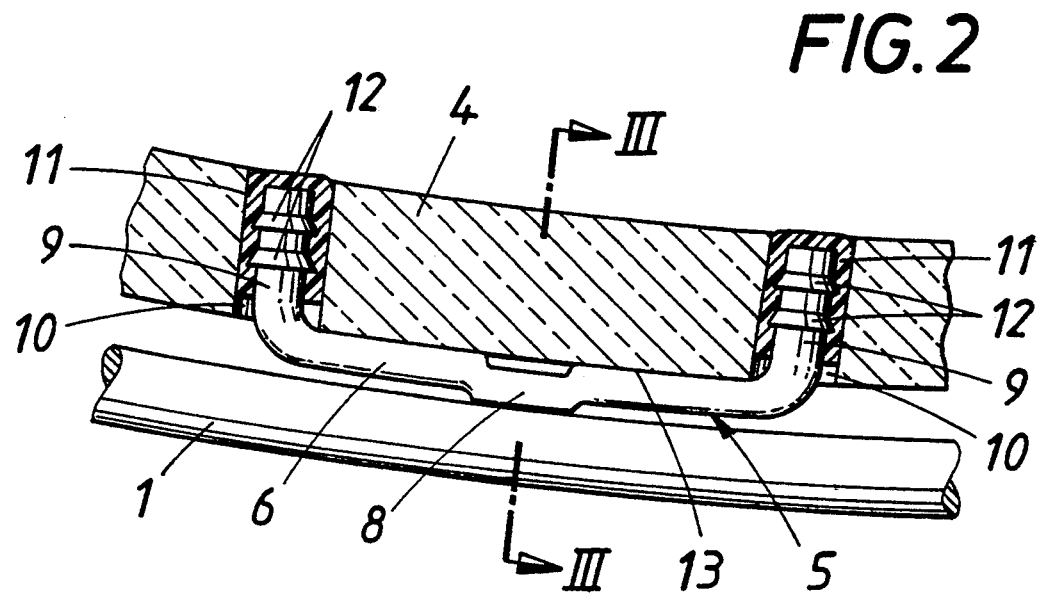
FIG. 2 is an enlarged longitudinal sectional view showing the glass-holding means viewed on a plane extending through the U-shaped wire.

Illustrative embodiments of the invention will be described more in detail with reference to the drawing.

In the illustrative embodiment shown in FIG. 1 the frame of eyeglasses is made of a spring wire, which constitutes a lens-holding frame portion 1 and two bows 2. The bows 2 are hinged to the lens-holding portion 1 by leaf spring-like flat portions 3 of the spring wire. About said hinge portions 3 the bows 2 can be inturned from the basic position shown in FIG. 1 toward the lens-holding portion 1 to assume a storage position and spread apart to assume a position for use.

Figure 3:
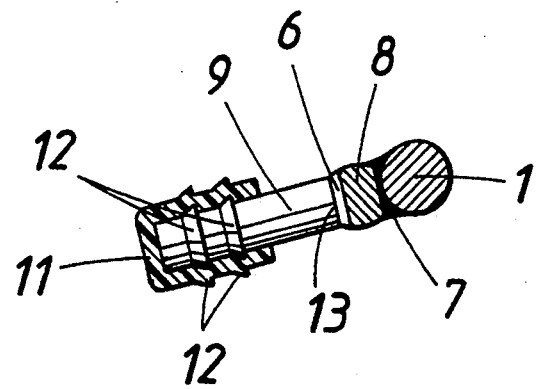
FIG. 3 is a sectional view taken on line III—III in FIG. 2 and showing the eyeglasses without the lenses.

The lenses 4 are connected to the wire which constitutes the lens-holding portion 1 by U-shaped wires 5, each of which comprises two legs, which are connected by a crosspiece 6 that is connected to the lens-holding portion 1 of the eyeglass frame by a deformable soldered joint 7, which is indicated in FIG. 3. For that purpose each U-shaped wire 5 has at the center of its crosspiece an offset portion 8, which facilitates the making of the soldered joint. The legs of the U-shaped wire 5 protrude from the crosspiece 6 and serve as retaining pins 9 for the lenses. Said retaining pins 9 extend in bores 10 of the lenses 4 and are held in the bores by pluglike plastic bushings 11. To ensure strong frictional joints between the retaining pins 9 and the plastic bushings 11 and between the latter and the surfaces of the bores 10, the retaining pins 9 and the plastic bushings 11 are provided in the illustrative embodiment shown in FIG. 3 on their peripheral surfaces with axially spaced apart annular ribs 12, which are barb-shaped in cross-section. But it will be sufficient to provide such annular ribs only on the retaining pins because the material of the plastic bushing 11 which has been inserted into the bore 11 will be displaced outwardly by such ribs. In such case the plastic bushings 11 might be provided with a retaining head and may be inserted from the outside into the bores 10 of the lenses before the retaining pins 9 are inserted into such bores.

For the connection of the lenses 4 to the lens-holding portion 1 of the eyeglass frame, it is sufficient to provide the lenses 4 with the bores 10 having a spacing which matches the spacing of the retaining pins 9. Any deviation can be compensated in a simple manner by the plastic bushing 11 and because the U-shaped wire 5 is deformable. Because the generally round U-shaped wire 5 is formed in its crosspiece 6 with a flat 13 for a surface engagement with the lens 4, the lenses 4 will effectively be retained and can subsequently be adjusted relative to the lens-holding portion 1 because the U-shaped wires 5 and the soldered joints 7 are deformable.

Figure 4:
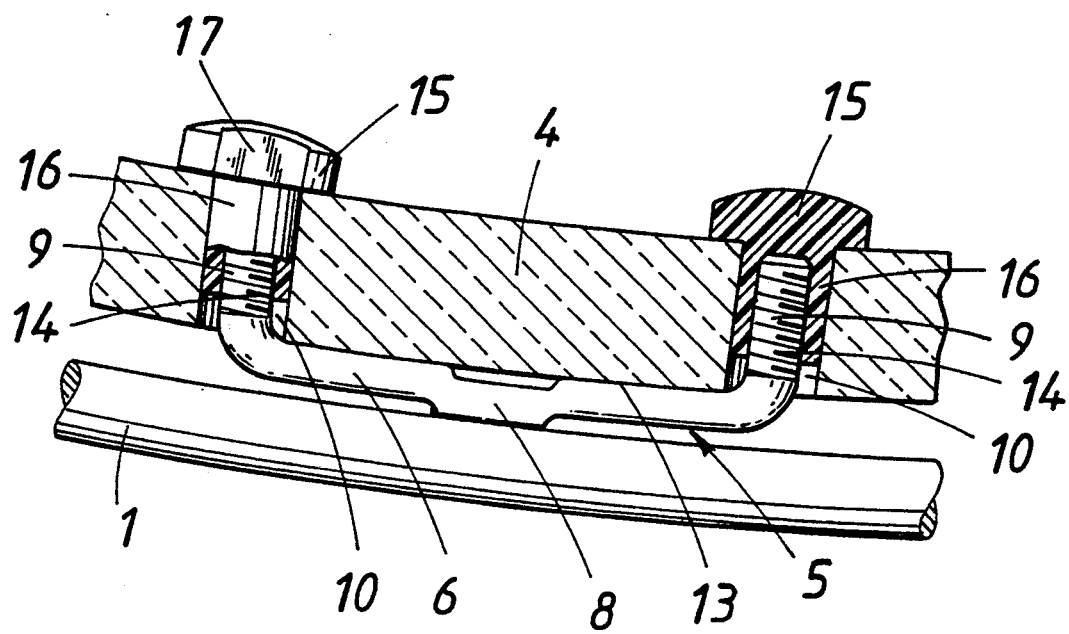
FIG. 4 is a view that is similar to FIG. 2 and illustrates a modification.

Alternative means for securing the lenses 4 to the retaining pins 9 are shown in FIG. 4. In that case the retaining pins 9 are provided with screw threads 14, on which retaining heads 15 made of plastic can be screwed, which have sleevelike extensions 16, which fit in the bores 10 of the lenses 4. The material of the retaining heads 15 is so selected that the retaining heads 15 need not be formed with female screw threads. To facilitate the handling of the retaining heads 15, the latter have lateral flats 17 for engagement by a wrench.

It will be understood that the invention is not restricted to the embodiments shown by way of example. For instance, the eyeglass frame need not be made of a spring wire. For the application of the invention it will be sufficient that the U-shaped wires 5 can be connected to a portion of the eyeglass frame and this requirement will hardly involve a restriction regarding the design of such portions of the eyeglass frame. For instance, within the scope of the invention the lenses 4 may be secured by the U-shaped wires to a bridge, by which the lenses are connected, and the bows may be connected in conventional manner to bow carriers, which are connected by U-shaped wires to the lenses.

I claim:
1. Eyeglasses comprising
   (a) an eyeglass frame comprising a lens-holding portion, the eyeglass frame lens-holding portion having an inside facing a wearer of the eyeglasses,
   (b) two eyeglass lenses, each of said lenses being formed with two spaced apart bores, and
   (c) two lens-holding U-shaped wires for said lenses, each of said lens-holding U-shaped wires comprising
      (1) a cross-piece fixedly connected to the inside of said lens-holding eyeglass frame portion and
      (2) a pair of legs constituting retaining pins extending into the bores of a respective one of the lenses and being directed away from the eyeglass frame, the crosspiece connecting the legs and being positioned between the inside of the lens-holding eyeglass frame portion and the lens.

2. The eyeglasses of claim 1, further comprising plastic bushings plugged into said bores, the retaining pins extending into said bushings, the bores, the bushings and the pins having coinciding axes extending substantially perpendicularly to the crosspiece.

3. The eyeglasses of claim 1, wherein the crosspiece of each one of the lens-holding U-shaped wires defines a bearing for a respective one of the lenses.

4. The eyeglasses of claim 1, further comprising a deformable soldered joint fixedly connecting each one of the crosspieces to the inside of the lens-holding eyeglass frame portion.

5. The eyeglass of claim 1, further comprising plastic retaining heads plugged into said bores, the retaining pins being formed with screw threads and the retaining heads being screwed on the screw threads of the retaining pins.

6. The eyeglasses of claim 2, wherein the plastic bushings have annular barbed ribs axially spaced apart on outside peripheral surfaces thereof.

7. The eyeglasses of claim 2, wherein the retaining pins have annular barbed ribs axially spaced apart on outside peripheral surfaces thereof.

8. The eyeglasses of claim 2, wherein the plastic bushings and the retaining pins have annular barbed ribs axially spaced apart on outside peripheral surfaces of the bushings and the retaining pins.

* * * * *